US009762087B2

(12) United States Patent
Metcalfe et al.

(10) Patent No.: US 9,762,087 B2
(45) Date of Patent: Sep. 12, 2017

(54) ANCILLARY SERVICES NETWORK APPARATUS (75) Inventors: Malcolm Stuart Metcalfe, Penticton (CA); John Todd Sankey, Vancouver (CA)

(73) Assignee: Enbala Power Networks Inc., North Vancouver, B.C.

( * ) Notice: Subject to any disclaimer, the term of this patent is extended or adjusted under 35 U.S.C. 154(b) by 1102 days.

(21) Appl. No.: 13/522,186

(22) PCT Filed: Jan. 12, 2011

(86) PCT No.: PCT/CA2011/000034
§ 371 (c)(1),
(2), (4) Date: Nov. 2, 2012

(87) PCT Pub. No.: WO2011/085477
PCT Pub. Date: Jul. 21, 2011

(65) Prior Publication Data
US 2013/0046895 A1    Feb. 21, 2013

Related U.S. Application Data (60) Provisional application No. 61/294,818, filed on Jan. 13, 2010, provisional application No. 61/360,357, filed on Jun. 30, 2010.

(51) Int. Cl.
*G06F 15/173* (2006.01)
*H02J 13/00* (2006.01)
*H04L 12/403* (2006.01)

(52) U.S. Cl.
CPC ........ *H02J 13/0017* (2013.01); *H04L 12/403* (2013.01); *Y02B 70/3266* (2013.01); *Y04S 20/242* (2013.01)

(58) Field of Classification Search
CPC .. H02J 13/0017; H04L 12/403; Y04S 20/242; Y02B 70/3266
(Continued)

(56) References Cited

U.S. PATENT DOCUMENTS 7,346,467 B2    3/2008 Bohrer et al.
7,536,240 B2    5/2009 McIntyre et al.
(Continued)

FOREIGN PATENT DOCUMENTS

WO    WO88/04494 A1    6/1988

OTHER PUBLICATIONS

International Search Report and Written Opinion of the International Searching Authority, dated May 2, 2011, for corresponding International Application No. PCT/CA2011/000034, 11 pages.
(Continued)

*Primary Examiner* — Ryan Jarrett
(74) *Attorney, Agent, or Firm* — Klarquist Sparkman, LLP (57) ABSTRACT An apparatus for providing Ancillary Services to an ISO controls multiple controllable resources over a network in a cost effective manner. The apparatus comprises a central server computer and multiple controllers communicative with the central server computer over a network. Each controller is located at a resource site and controls one or more resource devices. The central server computer has a memory with a program which executes the following operations: receives a services request signal from the ISO such as a Ancillary Services request, which requests a change in power consumed or supplied by the resources on the network; calculates the lowest cost means of delivering the requested Ancillary Services request; and sends setpoint (Continued)

control signals to the controller at each resource site where a change is needed, requesting a change in the operation of each resource device.

23 Claims, 5 Drawing Sheets

(58) Field of Classification Search
 USPC .................................................. 700/286–292
 See application file for complete search history.

(56) References Cited

U.S. PATENT DOCUMENTS

| | | | |
|---|---|---|---|
| 2005/0165511 A1* | 7/2005 | Fairlie | ....................... F17D 1/04 700/286 |
| 2008/0039979 A1* | 2/2008 | Bridges | ............... B60L 11/1816 700/292 |
| 2009/0029777 A1 | 1/2009 | Holt et al. | |
| 2009/0066287 A1* | 3/2009 | Pollack | .................. G06Q 50/00 700/296 |
| 2010/0314942 A1* | 12/2010 | Talkin | .................... G06Q 50/06 700/295 |

OTHER PUBLICATIONS

Office action dated Oct. 21, 2016, issued by the Canadian Intellectual Property Office in Canadian Patent Application No. 2,786,720 (4 pages).

\* cited by examiner

ANCILLARY SERVICES NETWORK APPARATUS

CROSS REFERENCE TO RELATED APPLICATIONS

This is the U.S. National Stage of International Application No. PCT/CA2011/000034, filed Jan. 12, 2011, which in turn claims the benefit of U.S. Provisional Application Nos. 61/294,818, filed Jan. 13, 2010 and 61/360,357, filed Jun. 30, 2010, all of which prior applications are incorporated herein in their entirety.

FIELD OF INVENTION

This invention relates generally to an apparatus for providing services such as Ancillary Services to an Independent System Operator (ISO) or integrated electricity provider.

BACKGROUND

Electricity is a currency for energy. It provides a convenient and safe means of delivering energy from sources, including heat from burning coal or nuclear fission, falling water, solar or wind power to users. Because electricity cannot easily be stored, generation (supply) and load (demand) must be maintained in a continuous balance. For more than 100 years, vertically integrated electric utilities have maintained this balance by continuously adjusting generation sources to match the total system demand. The utilities generally concluded that generation could be controlled easily, while loads could not.

Utilities face a number of key operational issues, one of which is system regulation. Also known as automatic generation control (AGC), system regulation is a process which measures the difference between supply and demand on a second by second basis, sending signals to specific generation sources every few seconds to maintain the exact balance. Traditionally, utilities have used dedicated generators for this role, selecting machines that have fast response and a range of operation that allows the AGC to be effective. The generators used for AGC provide a service known as regulation service. This service is bought by the ISO.

When purchasing regulation services, the ISO may send regulation services request signals to regulation service providers requesting a change in power to or from the grid in order to maintain the system balance. These signals may come every few seconds. The regulation service provider will react to the request, and send signals back to the ISO showing the change achieved.

The characteristics of the electric grid, including supply, load, transmission and distribution have changed with time, making it increasingly challenging to meet the system regulation demands of the ISO. The following general trends dominate this change:

Generation, which has always been stable, controllable and predictable has been augmented with new renewable generation that is almost the opposite.

The need for regulation services, which has traditionally been provided, using dedicated, fast response generation, has increased significantly, and is expected to continue to grow. At the same time, the portion of the supply with response characteristics that are suitable for providing regulation has been reduced. Almost all new generation is either large thermal which is not suitable for system regulation, or renewable supplies which is also not suitable for system regulation.

SUMMARY OF THE INVENTION

According to one aspect of the invention, there is provided an apparatus for providing Ancillary Services to an ISO or an integrated electrical utility by controlling a network of controllable resources, within the ISO or utility operating area. The apparatus comprises a central server computer and multiple controllers communicative with the central server computer. The communications can be made over the Internet or over a dedicated communications network. Each controller is located at a resource site and controls one or more resource devices which are normally independent devices used for a primary process other than providing Ancillary Services. The controllers can receive setpoint control signals from the central server computer and operate the resource devices to provide both Ancillary Services and satisfy their primary processes.

The central server computer has a memory with a program which can execute the following operations:
  report an aggregate capability and availability of a network of resources for providing a service such as Ancillary Services;
  receive a services request signal from the ISO such as a Ancillary Services request, which requests a change in power consumed or supplied by the resources;
  determine a cost-effective means to operate the resources to deliver the requested Ancillary Services request;
  send setpoint control signals to the controller at each resource site where a change is needed, requesting a change in the operation of each resource device; and
  report the aggregate status of the network of resources in meeting the services request signal.

The communications between the central server computer and the controllers are two-way. The central server computer sends setpoint control information to the controllers, and the controllers send resource status information back to the central server computer. For example, the central server computer can collect power measurements from each controller, which contain the power consumption of each resource device. This measurement can reflect the changes that have been requested of the resource device. The central server computer can then perform a sum of the power level for all resources that are used to provide the service, and send a signal to the ISO providing the total power used or delivered by the resources in the network that are being used to provide the service. The central server computer can also store the data collected from each resource, with a time stamp, that will allow the process to be audited later.

According to one aspect of the invention, there is provided a method for providing Ancillary Services to an Independent System Operator ("ISO") or an integrated electrical utility by directing the operation of a plurality of resources, each resource having a primary processes other than providing Ancillary Services, the method comprising:
  receiving a Ancillary Services request from an ISO or utility;
  selecting a cost-effective combination of the resources and operational setpoints of the resources that satisfy the Ancillary Services request as well as the primary process of each selected resource; and
  directing the selected resources to operate at the selected setpoints.

Directing the selected resources to operate at the selected setpoints may comprise:

communicating the selected setpoints for the selected resources to one or more controllers in communication with and operable to direct the operation of the selected resources; and directing the selected resources by the controllers to operate at the selected setpoints.

Directing the selected resources by the controllers to operate at the selected setpoints may also comprise:

determining by the controllers whether the selected setpoints satisfy the primary processes of the selected resources; and directing the selected resources by the controllers to operate at the selected setpoints only if the selected setpoints satisfy the primary processes of the selected resources.

The method may further comprise receiving from the controllers the state of the resources. The state of the resources may comprise one or more of: the current power consumed or supplied by the resources, the maximum power that may be consumed or supplied by the resources, the minimum power that may be consumed or supplied by the resources, the state of the primary processes of the resources, and the availability of the resources. A cost-effective combination of the resources and operational setpoints of the resources may be selected in response to a change of the state of one or more of the resources.

Selecting the cost-effective combination of resources and operational setpoints of the resources that satisfy the Ancillary Services request as well as the primary process of each selected resource may comprise:

determining the resources that are available to provide Ancillary Services;

determining allowable setpoints for the available resources;

determining combinations of the available resources and the allowable setpoints;

determining a cost of each combination; and selecting the combination having the lowest cost that satisfies the Ancillary Services request as well as the primary process of each selected resource.

The cost of each combination may be determined, at least in part, based on the cost of any estimated change in state of the primary processes of the resources in the combination resulting from the application of the setpoints in the combination. The cost of each combination may be determined, at least in part, based on the risk of any of the resources in the combination overriding a request to operate at the setpoints in the combination. The cost of each combination may be determined, at least in part, based on the estimated energy consumption of the resources in the combination resulting from the application of the setpoints in the combination. The cost of each combination may be determined, at least in part, based on the estimated amortized cost of mechanical wear-and-tear on the resources in the combination resulting from the application of the setpoints in the combination. The cost of each combination may be determined, at least in part, based on the estimated value of the Ancillary Services provided by the resources in the combination resulting from the application of the setpoints in the combination. The cost of each combination may be determined, at least in part, based on the status of each of the resources in the combination. The cost of each combination may be determined, at least in part, based on the estimated speed of response of the resources in the combination to directions to operate at the setpoints in the combination and the estimated value of the speed of response in providing the Ancillary Services.

Selecting a cost-effective combination of the resources and operational setpoints of the resources may be based, at least in part, upon the estimated financial cost of operating the resources at particular setpoints.

The method may further comprise communicating to the ISO or utility the aggregate response of the resources to the Ancillary Services request, and/or communicating to the ISO or utility the estimated capacity of the resources in the aggregate to provide Ancillary Services.

According to one aspect of the invention, there is provided an apparatus for providing Ancillary Services to an Independent System Operator ("ISO") or an integrated electrical utility by directing the operation of a plurality of resources, each resource having a primary processes other than providing Ancillary Services, the apparatus comprising:

a server in communication with the ISO or utility and with the resources and having a memory with statements and instructions recorded thereon executable by the server to:

receive a Ancillary Services request from the ISO or utility;

selecting a cost-effective combination of the resources and operational setpoints of the resources that satisfy the Ancillary Services request as well as the primary process of each selected resource; and directing the selected resources to operate at the selected setpoints.

The apparatus may further comprise one or more controllers in communication with the server and resources, the controllers operable to direct the resources to operate at operational setpoints received from the server.

Directing the selected resources to operate at the selected setpoints may comprise:

communicating the selected setpoints for the selected resources to the one or more controllers in communication with the selected resources; and directing the selected resources by the controllers to operate at the selected setpoints.

The one or more controllers may be operable to direct the selected resources to operate at the selected setpoints by:

determining whether the setpoints satisfy the primary processes of the selected resources; and directing the selected resources to operate at the selected setpoints only if the selected setpoints satisfy the primary processes of the selected resources.

The controllers may be operable to communicate and the server may be operable to receive the state of the resources. The state of the resources may comprise one or more of: the current power consumed or supplied by the resources, the maximum power that may be consumed or supplied by the resources, the minimum power that may be consumed or supplied by the resources, the state of the primary processes of the resources, and the availability of the resources. A cost-effective combination of the resources and operational setpoints of the resources may be selected in response to a change of the state of one or more of the resources.

Selecting the cost-effective combination of resources and operational setpoints of the resources may comprise:

determining the resources that are available to provide Ancillary Services;

determining allowable setpoints for the available resources;

determining combinations of the available resources and the allowable setpoints;

determining a cost of each combination; and selecting the combination having the lowest cost that satisfies the Ancillary Services request as well as the primary process of each selected resource.

The cost of each combination may be determined, at least in part, based on the cost of any estimated change in state of the primary processes of the resources in the combination resulting from the application of the setpoints in the combination. The cost of each combination may be determined, at least in part, based on the risk of any of the resources in the combination overriding a request to operate at the setpoints in the combination. The cost of each combination may be determined, at least in part, based on the estimated energy consumed by the resources in the combination resulting from the application of the setpoints in the combination. The cost of each combination may be determined, at least in part, based on the estimated amortized cost of mechanical wear-and-tear on the resources in the combination resulting from the application of the setpoints in the combination. The cost of each combination may be determined, at least in part, based on the estimated value of the Ancillary Services provided by the resources in the combination resulting from the application of the setpoints in the combination. The cost of each combination may be determined, at least in part, based on the status of each of the resources in the combination. The cost of each combination may be determined, at least in part, based on the estimated speed of response of the resources in the combination to control signals and the estimated value of the speed of response in providing the Ancillary Services.

Selecting a cost-effective combination of the resources and operational setpoints of these resources may be based upon the estimated financial cost of operating the resources at particular setpoints.

The memory of the server may further comprise statements and instructions recorded thereon and executable by the server to communicate to the ISO or utility the aggregate response of the resources to the Ancillary Services request, and/or the estimated capacity of the resources in aggregate to provide Ancillary Services.

According to one aspect of the invention, there is provided a computer readable medium for providing Ancillary Services to an Independent System Operator ("ISO") or an integrated electrical utility by directing the operation of a plurality of resources, each resource having a primary processes other than providing Ancillary Services, the computer readable medium having statements and instructions recorded thereon for execution by a server to:
  receive a Ancillary Services request from an ISO or utility;
  select a cost-effective combination of the resources and operational setpoints of the resources that satisfy the Ancillary Services request as well as the primary process of each selected resource; and
  direct the selected resources to operate at the selected setpoints.

Directing the selected resources to operate at the selected setpoints may comprise:
  communicating the selected setpoints for the selected resources to one or more controllers in communication with and operable to direct the operation of the selected resources; and
  directing the selected resources by the controllers to operate at the selected setpoints.

Directing the selected resources by the controllers to operate at the selected setpoints may comprise:
  determining by the controllers whether the selected setpoints satisfy the primary processes of the selected resources; and
  directing the selected resources by the controllers to operate at the selected setpoints only if the selected setpoints satisfy the primary processes of the selected resources.

The computer readable medium may further comprise statements and instructions recorded thereon for execution by the server to receive from the controllers the state of the resources. The state of the resources may comprise one or more of: the current power consumed or supplied by the resources, the maximum power that may be consumed or supplied by the resources, the minimum power that may be consumed or supplied by the resources, the state of the primary processes of the resources, and the availability of the resources. A cost-effective combination of the resources and operational setpoints of the resources may be selected in response to a change of the state of one or more of the resources.

Selecting the cost-effective combination of resources and operational setpoints of the resources that satisfy the Ancillary Services request as well as the primary process of each selected resource may comprise:
  determining the resources that are available to provide Ancillary Services;
  determining allowable setpoints for the available resources;
  determining combinations of the available resources and the allowable setpoints;
  determining a cost of each combination; and
  selecting the combination having the lowest cost that satisfies the Ancillary Services request as well as the primary process of each selected resource.

The cost of each combination may determined, at least in part, based on the cost of any estimated change in state of the primary processes of the resources in the combination resulting from the application of the setpoints in the combination. The cost of each combination may be determined, at least in part, based on the risk of any of the resources in the combination overriding a request to operate at the setpoints in the combination. The cost of each combination may be determined, at least in part, based on the estimated energy consumption of the resources in the combination resulting from the application of the setpoints in the combination. The cost of each combination may be determined, at least in part, based on the estimated amortized cost of mechanical wear-and-tear on the resources in the combination resulting from the application of the setpoints in the combination. The cost of each combination may be determined, at least in part, based on the estimated value of the Ancillary Services provided by the resources in the combination resulting from the application of the setpoints in the combination. The cost of each combination may be determined, at least in part, based on the status of each of the resources in the combination. The cost of each combination may be determined, at least in part, based on the estimated speed of response of the resources in the combination to directions to operate at the setpoints in the combination and the estimated value of the speed of response in providing the Ancillary Services.

Selecting a cost-effective combination of the resources and operational setpoints of the resources may be based, at least in part, upon the estimated financial cost of operating the resources at particular setpoints.

The computer readable medium may further comprise statements and instructions recorded thereon for execution by the server to communicate to the ISO or utility the aggregate response of the resources to the Ancillary Services request, and/or the estimated capacity of the resources in the aggregate to provide Ancillary Services.

DETAILED DESCRIPTION

Apparatus

Figure 1:
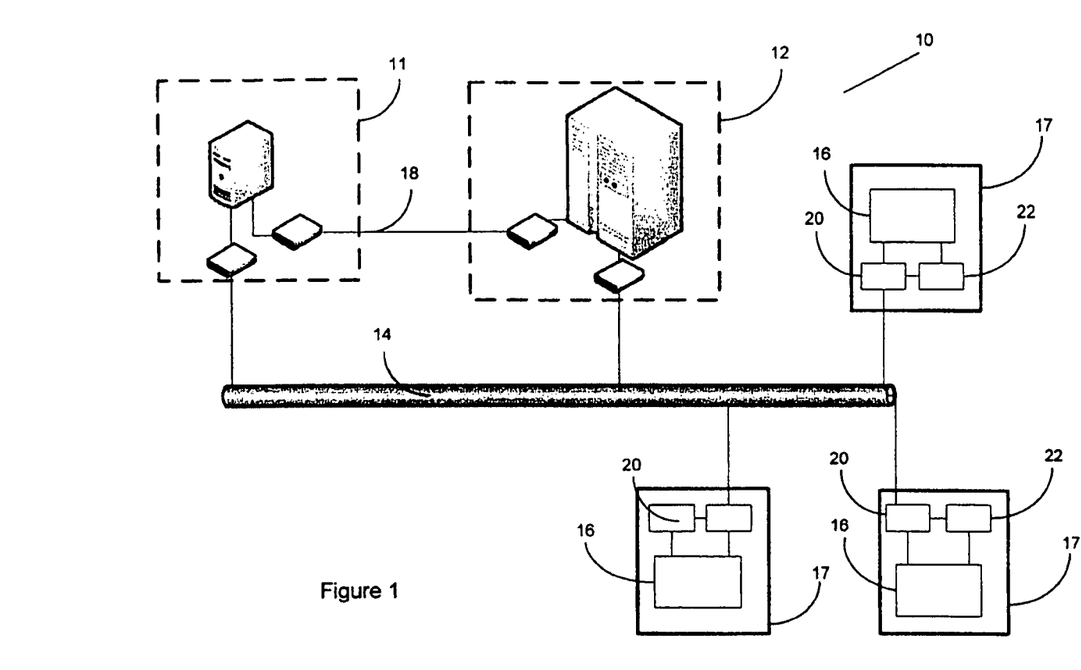
FIG. 1 is a block diagram of an apparatus for providing regulation and other ancillary services to an ISO using a network of resource devices.

In the embodiments of the invention described herein and referring to FIG. 1, an apparatus 10 for providing system regulation and other ancillary services to an ISO 11 or integrated electrical utility comprises a central server computer 12 that is communicative over a network 14 with the ISO 11 or utility and with multiple resource devices 16 (alternatively referred to as "devices" or "resources") within the ISO or utility operating area. The central server computer 12 is programmed to control the resources 16 to deliver one or more services requested by the ISO. The resources 16 are typically located at sites 17 remote from the server computer 12 ("resource sites") and can be electrical generators having capacity to generate power ("generation resource"), electrically-powered devices having capacity to consume a load ("load resource"), and storage devices having capacity to store energy ("storage resource") for short periods and later release it back to the grid.

An ISO oversees, controls and monitors the operation of an electrical power system for a geographic region, usually within a single province or state, but sometimes encompassing multiple provinces or states. In one embodiment of the invention, the apparatus 10 is operated by a network operator and is configured to provide system regulation services to the ISO, otherwise known as automatic generation control ("AGC"); however, the system can be additionally or alternatively configured to provide one or more other services, such as demand response, renewable supply firming, load ramp support, spinning reserve, frequency regulation, system inertia, and emergency load shedding (the regulation services and other services collectively referred to as "Ancillary Services").

In this embodiment, the server computer 12 receives a services request signal from the ISO for the apparatus to provide system Ancillary Services ("Ancillary Services request"); in particular, the Ancillary Services request signal represents a request to the apparatus 10 to provide a change in electrical power delivered to (or from) the system as a whole within a certain period of time. The request signal is typically updated quite frequently, in the order of every six seconds. In response to this request, the server computer 12 operates multiple resources 16 to provide the change in electrical power in a cost-optimized manner, by varying the operation of one or more of a load resource, generation resource, or storage resource that is under the partial control of the apparatus 10. More particularly, the server computer 12 can coordinate the operation of multiple normally independent resources in a non-proportionate, non-linear manner which enables the aggregate response of the controlled resources 16 to more closely resemble the Ancillary Services request signal than if the same resources 16 were independently controlled, or were controlled in proportionate or linear manner.

The server computer 12 is a redundant server computer system, equipped with a reliable operating system such as Linux, real time software, and a long-term database. The server computer 12 is desirably installed at a secure location, protected from unauthorized physical access, where there is a reliable connection to the internet and a backed-up supply of electricity. The server computer 12 may be a system that is spread across multiple hardware chassis either to aggregate sufficient processing capability, or to provide redundancy in the event of failure, or both. One chassis can operate as the primary server computer 12, and another as a backup server computer 12. Each chassis can run a multi-core capable operating system.

The server computer 12 can communicate with the ISO 11 over the Internet 14, either directly or with the addition of security tunnelling hardware or software. Alternatively, the server computer 12 can be fitted with dedicated communication links 18 to the ISO 11, such as Frame Relay.

The server computer 12 has a memory on which is stored a software program which examines all of the resources 16 that are connected to the server computer 12 and will select a cost-effective means of achieving the target level or adjustment specified by the ISO 11.

In this embodiment, the controllable resources 16 are all load resources, and in particular comprise multiple single-speed water pumps, analog electrical boilers, and analog electrical blowers. These electrically-powered devices 16 are normally intended to serve a primary process other than providing Ancillary Services to the ISO 11, and the apparatus 10 is configured to operate these devices 16 to provide Ancillary Services only within the operational constraints defined by the original primary processes of these devices 16. For example the water pumps are used primarily to regulate the water level in a municipal water supply tank, each electrical boiler is used primarily to provide heat and domestic hot water for a building as part of a hybrid electric-gas heating system, and the blowers are used primarily to aerate a waste water treatment tank. Each device 16 includes a controller 22 for carrying out these primary purposes ("local device controller").

In addition to the local device controller 22, another controller 20 is provided at the resource site 17 for system Ancillary Services ("services controller"), and which communicates with the remotely-located server computer 12 and which controls the operation of each device 16; each services controller 20 is programmed to receive control signals from the server computer 12 comprising an operational setpoint and to operate the devices at the specified setpoint to provide Ancillary Services, but are also programmed to only operate these devices 16 when the setpoint is within the operational constraints defined by the local device controller 22. In other words, the services controller 20 is programmed to allow the local device controller 22 to override the services controller 20 when the primary process operators require the devices 16 to be used for their primary processes. For example, a municipal water plant operator may require that a water tank be kept between 10% and 90% full of water, and the services controller 20 is programmed to allow the server computer 12 to operate the pumps for this tank while the water level is within this range. However, when the water level in the tank rises to 90% full, the local device controller 22 will turn the pumps on, even if the server computer 12 desires the pumps to be kept off. Controllable resources 16 which are being used at a given time to serve their primary process are considered to be "off-line" to the server computer 12 and not available to provide system regulation; conversely, controllable resources 16 whose devices are within their primary operational constraints are considered "on-line" and available to be used to provide system regulation. "Off-line" resources are compensated for by the server computer 12 with other "on-line" resources so that the overall network operating point satisfies the ISO 11 request.

The server computer 12 will then store all state data used for all ontologies, all communications with the ISO 11, and all control actions to be maintained for potential audit purposes.

The services controller 20 in this embodiment is a small rugged computer with capability to connect to the Internet 14, and to connect to resource devices 16 at the resource site 17. The connection between the services controller 20 and the server computer 12 is achieved through the internet 14, using a secure means of communications, in many cases using similar or even the same security protocols used for communications between the server computer 12 and the ISO 11. The services controller 20 is connected to the generation resource, load resource, or storage resource using one of a number of methods: direct wiring to controllers or governors for the resource devices 16; direct connection to the Supervisory Control and Data Acquisition (SCADA) System used to control the resource devices at the resource location, or connection to a network 14 used by the local control system at the resource site 17 to control the resource devices 16. The services controller 20 is also connected to metering devices (not shown) that measure, to revenue standards, the power being delivered or consumed by the resources.

The services controller 20 may be connected to additional measurement equipment (not shown) as required to insure that operating constraints can be properly met, by: direct wiring to controllers or measurement equipment; direct connection to the SCADA System used to measure the resource devices 16 at the resource site 17; or connection to a network 14 used by the local controller 22 at the resource location to measure the resource devices 16.

In operation, the services controller 20 will receive a setpoint signal from the server computer 12, directing a change in consumption or generation from one or more of the resource devices 16 at the resource site 17. The services controller 20 will validate the received signal against the operating constraints of the resource device 16 and clamp the signal if required. The local controller 22 will send the setpoint signal to the resource device 16 identified by the server computer 12, commanding the requested change.

At every update interval (e.g. 2 seconds), the services controller 20 will send a series of signals to the server computer 12, specifically:

The status or level of operation of each resource device 16 at the resource site 17 (there may be multiple resource devices connected to each services controller). The services controller 20 will aggregate and send a total power signal to the server computer 12, reflecting the power generated or consumed at that site;

The services controller 20 will send a separate signal to the server computer 12 to define the maximum and minimum power levels that are available for the existing resource devices 16 at the resource site 17;

Any additional state information required by the server computer 12 to execute its costing subroutine, as will be described below; and An indicator if the services controller 20 itself, or the SCADA, or other local control system 22, has suspended server computer 12 control, and the current local control setpoint if the server computer 12 control is suspended.

The services controller 20 will then store the command status and the power levels measured for every resource at the resource site 17. Data storage at the local services controller 20 should be sufficient to maintain all records for an extended period of time, for example two years. The server computer 12 and the services controllers 20 are time-synchronized so that all time-stamped communications between nodes can be properly interpreted. The control and status protocol between the server computer 12 and the services controllers 20 insures that network issues (e.g. packet loss or reordering), does not cause incorrect control actions. The system will run continuously, with an intended cycle time between ISO 11 commands of about 4 seconds, and a cycle time between the server computer 12 and the services controllers 20 of about 2 seconds. Local storage of data is maintained, time stamped in the revenue grade meters, in the server computer 12 and in the services controllers 20. The availability of this data will enable the entire process to be subjected to audits to confirm that the system is in fact responding as claimed to the ISO request signals.

According to an alternative embodiment and instead of installing a separate services controller 20, the existing programming of the local device controller 22 can be modified to communicate with the server computer 12 and operate the devices 16 according to the control signals received from the server computer 12.

As another alternative embodiment, the services controller 20 can incorporate the programming of the local device controller 22.

As a further alternative embodiment, the apparatus 10 may comprise multiple server computers 12 in communication with one another over a network. In one embodiment, a master server computer may communicate with multiple local server computers. Each local server computer may control multiple resource devices 16 and aggregate the resource devices 16 under its control such that the aggregate resource devices 16 are presented to the master server computer as a single resource device 16. Further, each local server computer may act as a master server computer with respect to additional sub-local server computers in communication with the local server computer, and so on.

Operation

Figure 2A:
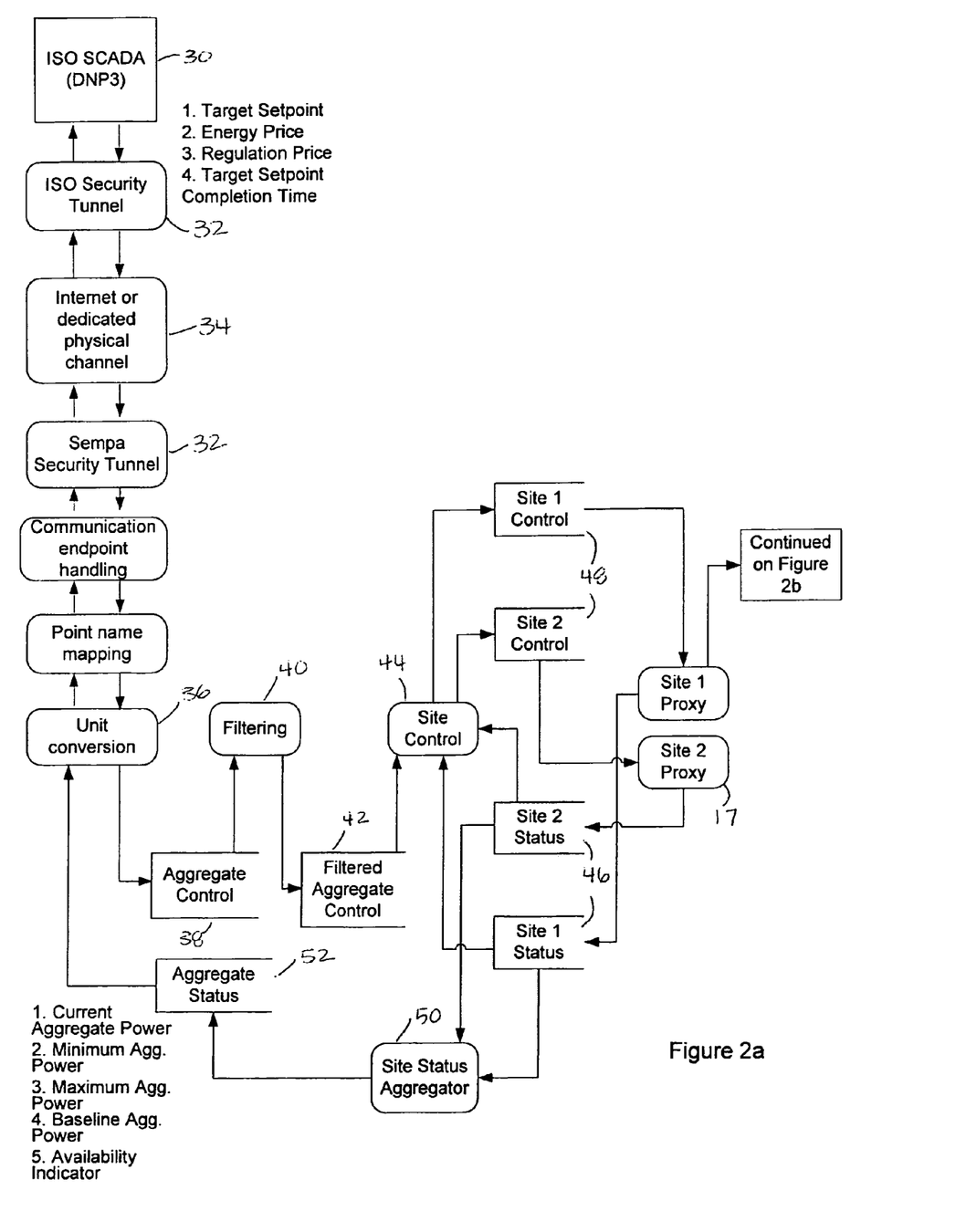
FIGS. 2A and 2B provide a system diagram illustrating function modules of a central server computer of the apparatus, which communicates with the ISO and with the network of controllable resource devices.
Figure 2B:
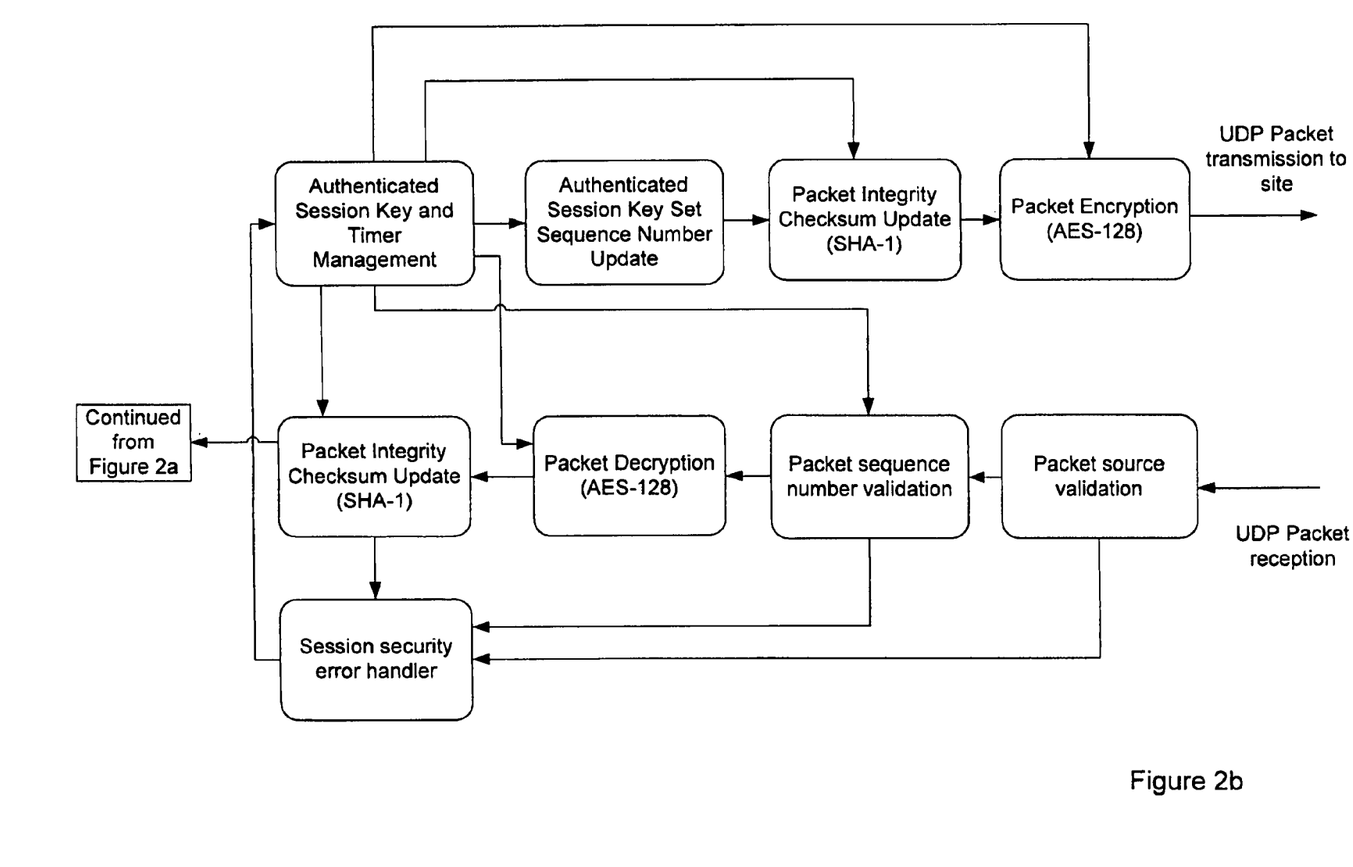

Referring to FIGS. 2A and 2B, the server computer 12 is programmed to receive and process a Ancillary Services request signal from the ISO 11, and then to transmit a control signal to the controllable resources 16 via the services controllers 20 to operate the resources 16 in a manner which in aggregate provides a suitable response to the Ancillary Services request signal. The Ancillary Services request signal comprises at least: (a) a target setpoint, (b) a target setpoint completion time, (c) an energy price, and (d) a regulation price. The target setpoint may be either a change in the operating point power for the network, or an absolute operating point power for the network. The target setpoint completion time is the amount of time the server computer 12 has to achieve the target setpoint; the energy price is the wholesale price of electricity at the time the Ancillary Services request is made, and may be used by cost functions in determining the financial cost of operating a resource at an particular setpoint, as will be explained in more detail below. The regulation price is the monetary amount the ISO 11 will pay the RSN for providing the requested services, and may also be used by cost functions.

The system regulation signal is transmitted from the ISO 11 via a SCADA computer system 30 as is well known in the art. The SCADA sets up a secured communications connection with the control server via the internet with a security at each end 32 of the connection or a dedicated physical channel 34.

The server computer 12 has several software modules which are executed to process the Ancillary Services request signal and in particular, format the signal into a standardized form that can be processed by the server computer 12. For example, a unit conversion module 36 converts the units of power, time, and price from the request signal into the units understood by the server computer 12. Once the data in the request signal has been properly formatted, this data is stored in an aggregate control database 38, which can be optionally filtered by a filtering module 40. The filtering module 40 applies a filter to the request signal to exclude short spikes in the request signal; such spikes represent rapid changes in setpoint which cannot be met by controllable resources which do not have sufficiently rapid response rates or sufficiently restrictive operating constraints.

The filtered request signal is stored in a filtered aggregate control database 42 for use by a site control module 44. The site control module 44 contains programming which determines which resources should be operated at a particular time to provide a suitable response to the Ancillary Services request signal. In particular, the site control module 44 executes a resource management program which determines which resources 16 are the most cost-effective to operate at any given time, then sends a control signal to those resources 16 to meet the Ancillary Services request. In order to determine the relative cost to operate a resource 16 at a particular point in time, the site control module programming includes a costing sub-routine which attributes a financial cost for operating each resource 16 at a particular point in time. The costing subroutine takes into consideration factors such as the purchase price of electricity required to operate the resource 16 at that time instance, and the cost that must be paid to the primary process operator of the device 16 for using the resource 16 at that time instance. The aggregated cost is then multiplied by a risk factor allocated to each resource 16 at that time instance; this risk factor takes into consideration the risk that over the period of time the resource 16 will be used to provide system regulation, the primary process operator will override system regulation operation and use the resource 16 for its primary purpose.

Inputs for the costing sub-routine include the energy price data in the ISO Ancillary Services request signal, as well as status data transmitted from each resource and which is stored in respective site status databases 46 (Shown in FIGS. 2A and 2B as "Site 1 Status", "Site 2 Status" etc.). In particular, the status data includes whether the devices of a particular resource 16 is currently being used, whether the local controller 22 is overriding the system regulation control signal sent by the server computer 12, and the parameters which define the process and device constraints, i.e. any limits to the operation of the devices 16 dictated by the operational requirements of the devices 16 to serve their primary process (e.g. to pump a water tank when filled beyond its limit) or by the physical operational limits of the devices themselves (e.g. when the device is overheated). This status data can be considered to define the "ontology" of each resource 16.

Figure 3A:
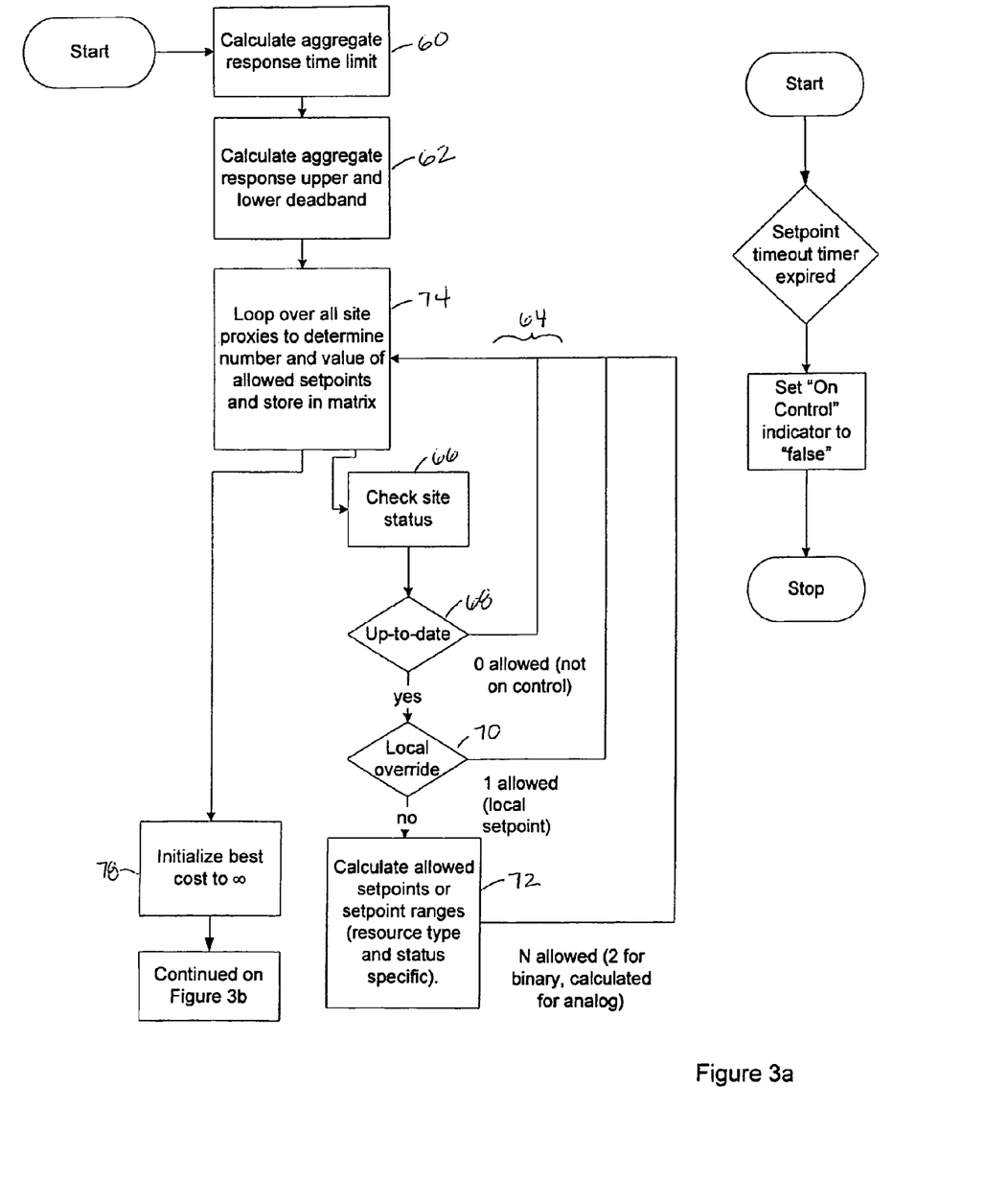
FIGS. 3A and 3B provide a flow chart illustrating execution of an optimization engine algorithm on the central server computer.
Figure 3B:
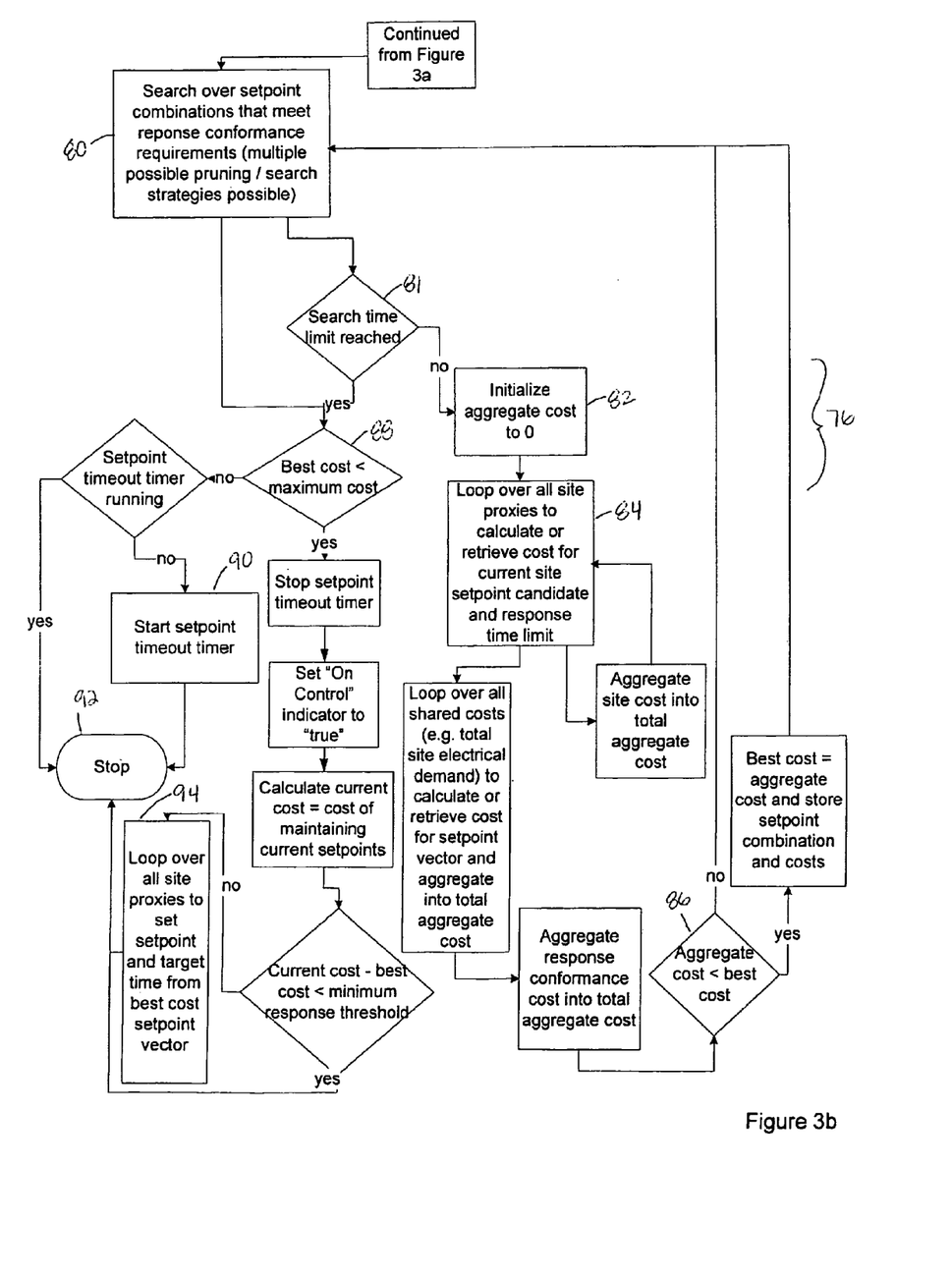

Operation of the resource management program on the site control module 44 is now described with reference to FIGS. 3A and 3B. As noted above, the purpose of this program is to determine, based on the Ancillary Services request signal received from the ISO 11, which resources 16 to operate at a particular time to provide a suitable response to the request signal. The program starts by calculating the aggregate response time limit 60, using the target setpoint completion time data from the Ancillary Services request signal; this time limit represents the latest time that a controllable resource 16 can act to provide a regulation response.

The program then at block 62 calculates the aggregate response upper and lower deadbands. This step determines the precision of the target setpoint in the Ancillary Services request signal, and is usually provided by the ISO 11 as part of the request signal itself, or is provided implicitly as part of its market rules.

Next, the program then executes a combination-defining subroutine 64 to produce multiple possible combinations of setpoints at which the controllable resources 16 can be operated. Each combination comprises a proposed setpoint for operating each controllable resource 16. In particular, the combination-defining subroutine 64 first checks each resource site to determine if the status signal from each site is up-to date (block 66); if no, then the resource 16 is considered not part of the network (block 68). If yes, then the subroutine checks to see if the local controller 22 is overriding the server computer's control of the resource 16 (block 70); if yes, then the resource 16 is considered "off-line" and must be operated at the setpoint mandated by the local controller 22. If no, then the resource 16 is considered on-line and allowed to operate at any proposed setpoint, albeit at potentially different costs for each (block 72).

The combination-defining subroutine repeats itself for each resource 16, by looping over each site proxy 17 to determine the number and value of the setpoints for all of the allowed resources 16 (block 74). The determination of each possible set of setpoints can be expressed mathematically, as follows:

Each possible set of setpoints S is a set of N setpoints, where N is the number of resources 16 in the network and the set includes one setpoint for each resource 16:

$$S=\{S_i | 1 \leq i \leq N\}$$

where:
N is the number of resources in the network, and
$S_i$ is the setpoint for resource i.
Each valid set of setpoints considered must satisfy the precision constraint set by the ISO 11, namely:

$$S_{ISO} - L_{LOWER} \geq \sum_{i=1}^{N} S_i \leq S_{ISO} + L_{UPPER},$$

where:
$S_{iso}$ is the setpoint received from the ISO 11,
$L_{LOWER}$ is the lower precision requirement, and
$L_{UPPER}$ is the upper precision requirement Any set of setpoints that satisfies this precision constraint is a possible state of the resource network that can be used to satisfy the ISO's aggregate setpoint, i.e. its Ancillary Services request.

Any one resource 16 in the resource network has a set of setpoints at which it can operate. For example, an AC motor with only one set of windings has two possible setpoints, associated with the states ON and OFF. An adjustable speed drive pump has a fixed number of setpoints but greater than two (say 3 or 4), and a variable speed drive pump has a continuum of setpoints between OFF and its maximum speed.

$$S_i^{RESOURCE} = \{S_{i,j}^{RESOURCE} | 1 \le j \le M\}$$

where:
M is the number (possibly infinite) of allowed setpoints for resource i
$S_{i,j}^{RESOURCE}$ is the $j^{th}$ allowed setpoint for resource i in the network
$S_i^{RESOURCE}$ is the set of allowed setpoints for resource i in the network Once the combination-defining subroutine is completed, a single data structure is available from which can be formulated all possible sets of resource setpoints that satisfy the Ancillary Services request signal.

Once the data structure with the multiple possible combinations of setpoints is prepared, the program initializes a costing subroutine 76 to calculate an aggregate cost for each combination of setpoints and to select the combination that has the lowest aggregate cost; this selected combination represents the lowest cost of operating the resources according to the proposed combination of setpoints. Before the costing subroutine is executed, the program sets the best cost combination to infinity (block 78), then prunes the setpoint combinations to delete clearly non-practical or non-usable combinations (block 80). The costing subroutine 76 then starts by checking whether the aggregate response time limit has been reached (block 81). If no, then the sub-routine 76 initializes an Aggregate Cost variable to zero (block 82). The sub-routine then loops over all the site proxies 17 to calculate or retrieve the cost for operating each resource 16 at corresponding setpoint from the proposed combination and the response time limit of each resource (block 84). Further pruning of sub-optimal sets may take place based on these results.

Operation of a costing function in the costing subroutine will now be explained. For each possible setpoint for each resource, there is a corresponding benefit (or conversely, a cost) for operating the resource at that setpoint. A cost function is a function which takes as inputs a possible setpoint; the time of application of the setpoint, the current and historical states of the resource, and possibly additional information, and returns a cost value. So at any given time, there is a cost set for each resource which is the set of costs for the possible setpoints for the resource.

$$C_i^{RESOURCE} = \{C_{i,j}^{RESOURCE} | 1 \le j \le M\}$$

where
M is the number (possibly infinite) of allowed setpoints for resource i network
$C_{i,j}^{RESOURCE}$ is the cost of the $j^{th}$ allowed setpoint for resource i in the network
$C_i^{RESOURCE}$ is the set of costs of the allowed setpoints for resource i in the network For each resource, there is defined a cost function, $F_i^{RESOURCE}(P, \bar{s})$ that takes a setpoint, P, and a state vector, $\bar{s}$, and returns a cost. This cost function is used to determine the set of costs for a resource in terms of the set of allowed setpoints for the resource:

$$C_i^{RESOURCE} = \{F_i^{RESOURCE}(S)_{i,j}^{RESOURCE}, \bar{s}) | 1 \le j \le M\}$$

Note in particular because of the possible input to the cost function of the state vector $\bar{s}$, the set of costs for a resource may be time-varying.

There are many possible assignments or interpretations of a benefit or cost, but in order for the optimization to be successful, it is important that across all resource cost functions, the values returned are identically weighted, and so can be directly comparable. That is, for example, if:

$$C_{1,1}^{RESOURCE} < C_{2,1}^{RESOURCE}$$

(that is, cost 1 for resource 1 is less than cost 1 for resource 2), then it is always true that it is better to operate resource 1 at setpoint 1 than it is to operate resource 2 at setpoint 1.

One way of achieving this consistent weighting across all cost functions is if the value that they return is in fact an actual, financial benefit or cost for operating the resource at the specified setpoint.

Design of the cost function includes a number of considerations including:
1. Whether the resource is contributing to some process other than system regulation or it is purpose-built for supplying system Ancillary Services.
2. In the case of a resource that is contributing to another process:
   a. The state of the process that the resource is a part of and the cost of deviation from the normal process targets in order to provide regulation (e.g. the cost of reduced quality of product output from the process).
   b. The operating constraints imposed by the process and the risk of violating those constraints given the current process state and setpoint. This risk assessment is combined with either the cost of violating the constraints, or the risk of lost regulation revenue if the constraint is reached.
3. Energy consumed by the resource for operating at the setpoint, or the difference between the energy consumed at the setpoint and the energy consumed at the normal process target.
4. The amortized cost of mechanical wear-and-tear on the resource.
5. The value of the regulation of the resource.
6. The in-service status of the resource.
7. The speed of response of the resource to control signals and the value of speed of response in providing regulation.

Once the aggregate cost has been calculated for the setpoint combination being processed by the costing subroutine, the aggregate cost is compared against the current recorded best cost (block 86); if this is the first time the costing subroutine has been run, then the aggregate cost for the first combination will definitely be less than the initialized infinity value, and the program will select this first combination has having the best cost. The costing subroutine 76 returns to check whether the search time limit has been reached and if no, repeats until all of the combinations have been processed or pruned and the combination having the best cost will be selected. If the time limit has been reached, then the combination with the best cost to date will be selected.

Once the best cost combination has been selected, the program determines whether the best cost is less than a configurable and possibly time-varying maximum cost (block 88). The maximum cost represents the maximum cost that the network operator is willing to pay to provide Ancillary Services, and is determined by considering the regulation price offered by the ISO 11 in its services request signal and possibly other financial factors. If the best cost is not lower than the maximum cost, the program starts a setpoint timeout timer (block 90) and waits to see a new ISO services request signal is received or if the status of one or more resources changes such that the apparatus 10 can respond to in a profitable manner (i.e. can come up with a combination having a best cost that is lower than the maximum cost). If no such new request signal is received, then the program stops and withdraws from offering Ancillary Services to the ISO 11 (block 92).

If instead the best cost is lower than the maximum cost, then the program can execute the best cost setpoint combination to cause the resources 16 to operate to produce a response to the request signal. This is accomplished by looping over all the resource sites 17 to set the resource setpoint and target time according to the best cost setpoint combination (block 94). In other words, and referring to FIGS. 2A and 2B, the site control module stores the setpoint for each resource 16 in a site control data store 48, then a software module shown as "Site n Proxy" in FIGS. 2A and 2B takes care of sending the setpoint to the services controller 20 through a secured communications channel. This then leads to the controlled operation of the resource 16 according to the received setpoint.

Referring still to FIGS. 2A and 2B, the server computer 12 will then collect data from each of the services controllers 20, and will aggregate and store the collected data in order to present a single response signal to the ISO 11 (blocks 50 and 52). The server computer 12 sends several signals, in addition to the aggregated response signal to the ISO 11, specifically:
  the current total load or generation being used or provided by all resources controllable by the apparatus 10 (the basic response to the services request received from the ISO 11);
  the maximum available load or generation that the apparatus 10 can use or generate at that point in time;
  the minimum available load or generation that the apparatus 10 can use of generate at that point in time;
  the mid point to be used; and
  a flag indicating availability of the apparatus 10 to provide regulation.

The server computer 12 can then store all state data used for all ontologies, all communications with the ISO 11, and all control actions to be maintained for potential audit purposes.

As noted above, each resource 16 can be considered have its own "ontology", which includes all relevant state information about the resource measured at the resource site 17, all relevant state information about the resource 16 from previous control of the resource 16, all relevant state information about the electricity market, and a costing function that operates on the state information, stored in the server computer 12. Classes of costing functions are defined for classes of resources. Within a class, the costing functions use the same source/object code but possibly different configuration parameters. Different classes of costing functions use different source/object code as well as different configuration parameters. The costing functions define the cost of operation for that device for all possible states.

The costing function accepts a control action being contemplated for the resource device 16, and returns a number that is a weighted value, where the weighting is consistent across all ontologies in the network. The weighted value represents the relative merit of that device 16 as a source of regulation at the time of evaluation compared to all other devices 16 in the network. The weighted value, nominally the cost, is higher when the devices 16 is less valuable for the control action being contemplated, and lower when it is more valuable. For example, a pump that can be operated only three times each hour will have a high cost immediately after a control change, and this cost will fall slowly the more time elapses with no control change for that pump.

Where the device 16 has a hard constraint, the limits will impose a very large (or infinite) cost for violations of the constraint or the costing function will be limited to allowing only control actions that fall within the constrained levels.

Where the local primary process has to suspend control by the server computer 12 (e.g. when a tank is full), the services controller 20 informs the server computer 12 of the local override. At that time the costing function responds as if any control action that deviates from the local control setpoint has infinite cost.

The server computer 12 will compute the optimal response, using a standard optimization algorithm, and will send commands to one or more of the services controllers 20, directing changes in the operation of the local resources 16 at that node, to meet the targets established by the ISO 11. The server computer 12 will then collect data from each of the local service controllers 20, and will aggregate the signals in order to present a single response to the ISO 11. The server computer 12 will in fact send several signals, in addition to the aggregated response to the ISO 11, specifically:
  The current total load or generation being used or provided by all resources in the network (The basic response to the command received from the ISO 11)
  The maximum available load or generation that the network can use or generate at that point in time
  The minimum available load or generation that the network can use of generate at that point in time
  The mid point to be used.
  A flag indicating availability of the network for providing regulation.

EXAMPLE

A land-fill gas generator collects methane from a landfill site, stores the gas in a tank, and burns it to produce electricity. The normal process for this site is to produce electricity at a rate to keep the level in the tank at 50% of its capacity. Completely emptying the tank means the generator cannot produce electricity. Filling the tank means additional methane must be vented to the atmosphere, resulting in expensive environmental pollution fines for the owner of the generator.

In the case that there is no local controller, only the services controller, then the cost function includes as costs the wear-and-tear on the storage tank and any fines resulting from overfilling the tank. The benefits include the regulation revenue and the value of any energy produced.

In the case that there is a local controller, it would strictly enforce the constraint that the tank never be overfilled in order to avoid the fines. In this case, when the tank level exceeds some limit, the generator would always be run at maximum production in order to consume gas from the tank faster than it is being added from the landfill. If such an event happens, the output of the generator stops being under the control of the Ancillary Services apparatus 10 and is under the control of the local controller until the tank level is brought back down to a level that does not require venting of the tank to the atmosphere. In this case, compared to the previous case, the benefits are the same, namely the regulation revenue and the energy revenue. The costs are assessed differently, since the local controller will prevent fines. When the local controller supersedes the services controller, the device operates at a fixed operating point that does not contribute to the overall regulation target. The services controller, in order to continue to meet the aggregate regulation setpoint, must compensate for the locally overridden resource. The cost of compensating for the overridden resource becomes part of the cost function of the resource.

Suppose the services controller has turned off the generator in order to meet the aggregate setpoint. As a result of the generator being off, the tank is filling with methane. Once the tank fills past the safety limit, the local controller overrides the off setpoint from the services controller and turns the generator on to its maximum output in order to bring the tank back to a safe level. The aggregate setpoint has not changed, so the services controller now must compensate for the output of the generator by turning off enough other generating resources, or turning on enough other load resources, or some combination, in order to continue to meet the aggregate setpoint. This action effectively reduces the regulation capacity of the network by twice the size of the resource—the resource can no longer be controlled for regulation, and neither can the resources that are being used to compensate for it. So the cost function includes as a cost the lost regulation revenue whenever the local controller must override the services controller.

As a strategy for reducing the risk of local override of the services controller, the cost function may include an assessment of the risk of local override within some time interval. This risk assessment would be based on the state vector for the resource, and a prediction of the aggregate setpoint for that time interval. Such a prediction would return a likelihood of the resource setpoint hanging (e.g. burning gas more slowly than the rate of the tank filling) long enough to reach the constraint. This likelihood would be multiplied by the lost regulation revenue cost for all setpoints, not just setpoints after the constraint has been reached. The cost function would then include a cost parameter that has the tendency of keeping the tank away from the being full since the cost parameter monotonically increases as the tank level gets closer to the full state and the setpoint does not result in enough generation to drain the tank.

What is claimed is:

1. A method for providing ancillary services to an Independent System Operator ("ISO") or an integrated electrical utility by directing the operation of a plurality of resources selected from a group of controllable resources, each controllable resource having a primary process other than providing ancillary services and being either an on-line resource wherein its operational setpoints can be controlled to provide ancillary services by consuming or generating power within operational constraints of the primary process, or an off-line resource wherein its operational setpoints to consume or generate power are mandated by the primary process, the method comprising:

receiving a time varying ancillary services request signal from an ISO or utility;
receiving a time varying state signal of each controllable resource;
continuously selecting a cost-effective combination of the operational setpoints of the on-line and off-line resources that satisfy the time varying ancillary services request signal and the time varying state signal of each controllable resource, by selecting the operational setpoints of each on-line resource to consume or generate power to collectively provide the ancillary services as well as comply with the primary process of each on-line resource and compensate for power consumed or generated by each off-line resource, wherein the operational setpoints of each off-line resource to consume or generate power are mandated by the primary process of each off-line resource; and
continuously directing each on-line resource to operate at the selected operational setpoints and each off-line resource to operate at the mandated operational setpoints.

2. The method as claimed in claim 1 wherein directing the selected resources to operate at the selected setpoints comprises:

communicating the selected setpoints for the selected resources to one or more controllers in communication with and operable to direct the operation of the selected resources; and
directing the selected resources by the controllers to operate at the selected setpoints.

3. The method as claimed in claim 2 wherein directing the selected resources by the controllers to operate at the selected setpoints comprises:

determining by the controllers whether the selected setpoints satisfy the primary processes of the selected resources; and
directing the selected resources by the controllers to operate at the selected setpoints only if the selected setpoints satisfy the primary processes of the selected resources.

4. The method as claimed in claim 2 further comprising receiving from the controllers the state of the resources.

5. The method as claimed in claim 4 wherein the state of the resources comprises one or more of: the current power consumed or supplied by the resources, the maximum power that may be consumed or supplied by the resources, the minimum power that may be consumed or supplied by the resources, the state of the primary processes of the resources, and the availability of the resources.

6. The method as claimed in claim 4 wherein the cost-effective combination of the resources and operational setpoints of the resources is selected in response to a change of the state of one or more of the resources.

7. The method as claimed in claim 1 wherein selecting the cost-effective combination of resources and operational setpoints of the resources that satisfy the ancillary services request as well as the primary process of each selected resource comprises:

determining the resources that are available to provide ancillary services;
determining allowable setpoints for the available resources;
determining combinations of the available resources and the allowable setpoints;
determining a cost of each combination; and
selecting the combination having the lowest cost that satisfies the ancillary services request as well as the primary process of each selected resource.

8. The method as claimed in claim 1 wherein the cost of each combination is determined, at least in part, based on:

the cost of any estimated change in state of the primary processes of the resources in the combination resulting from the application of the setpoints in the combination; or the risk of any of the resources in the combination overriding a request to operate at the setpoints in the combination; or the estimated energy consumption of the resources in the combination resulting from the application of the setpoints in the combination; or the estimated amortized cost of mechanical wear-and-tear on the resources in the combination resulting from the application of the setpoints in the combination; or the estimated value of the ancillary services provided by the resources in the combination resulting from the application of the setpoints in the combination; or the status of each of the resources in the combination; or the estimated speed of response of the resources in the combination to directions to operate at the setpoints in the combination and the estimated value of the speed of response in providing the ancillary services.

9. The method as claimed in claim 1 wherein selecting a cost-effective combination of the resources and operational setpoints of the resources is based, at least in part, upon the estimated financial cost of operating the resources at particular setpoints.

10. The method as claimed in claim 1 further comprising communicating to the ISO or utility the aggregate response of the resources to the ancillary services request or the estimated capacity of the resources in the aggregate to provide ancillary services.

11. An apparatus for providing ancillary services to an Independent System Operator ("ISO") or an integrated electrical utility by directing the operation of a plurality of resources selected from a group of controllable resources, each controllable resource having a primary process other than providing ancillary services and being either an on-line resource wherein its operational setpoints can be controlled to provide ancillary services by consuming or generating power within operational constraints of the primary process, or an off-line resource wherein its operational setpoints to consume or generate power are mandated by the primary process, the apparatus comprising:

a server in communication with the ISO or utility and with the resources and having a memory with statements and instructions recorded thereon executable by the server to:

receive a time varying ancillary services request signal from the ISO or utility;

receive a time varying state signal of each controllable resource;

continuously select a cost-effective combination of the operational setpoints of the on-line and off-line resources that satisfy the time varying ancillary services request signal and the time varying state signal of each controllable resource, by selecting operational setpoints of each on-line resource to consume or generate power to collectively provide the ancillary services as well as comply with the primary process of each on-line resource and compensate for power consumed or generated by each off-line resource, wherein the operational setpoints of each off-line resource to consume or generate power are mandated by the primary process of each off-line resource; and continuously direct each on-line resource to operate at the selected operational setpoints and each off-line resource to operate at the mandated operational setpoints.

12. The apparatus as claimed in claim 11 further comprising one or more controllers in communication with the server and resources, the controllers operable to direct the resources to operate at operational setpoints received from the server.

13. The apparatus as claimed in claim 12 wherein directing the selected resources to operate at the selected setpoints comprises:

communicating the selected setpoints for the selected resources to the one or more controllers in communication with the selected resources; and directing the selected resources by the controllers to operate at the selected setpoints.

14. The apparatus as claimed in claim 13 wherein the one or more controllers are operable to direct the selected resources to operate at the selected setpoints by:

determining whether the setpoints satisfy the primary processes of the selected resources; and directing the selected resources to operate at the selected setpoints only if the selected setpoints satisfy the primary processes of the selected resources.

15. The apparatus as claimed in claim 14 wherein the state of the resources comprises one or more of: the current power consumed or supplied by the resources, the maximum power that may be consumed or supplied by the resources, the minimum power that may be consumed or supplied by the resources, the state of the primary processes of the resources, and the availability of the resources.

16. The apparatus as claimed in claim 13 wherein the controllers are operable to communicate and the server is operable to receive the state of the resources.

17. The apparatus as claimed in claim 16 wherein a cost-effective combination of the resources and operational setpoints of the resources is selected in response to a change of the state of one or more of the resources.

18. The apparatus as claimed in claim 11 wherein selecting the cost-effective combination of resources and operational setpoints of the resources comprises:

determining the resources that are available to provide ancillary services;

determining allowable setpoints for the available resources;

determining combinations of the available resources and the allowable setpoints;

determining a cost of each combination; and selecting the combination having the lowest cost that satisfies the ancillary services request as well as the primary process of each selected resource.

19. The apparatus as claimed in claim 11 wherein the cost of each combination is determined, at least in part, based on:

the cost of any estimated change in state of the primary processes of the resources in the combination resulting from the application of the setpoints in the combination; or the risk of any of the resources in the combination overriding a request to operate at the setpoints in the combination; or the estimated energy consumed by the resources in the combination resulting from the application of the setpoints in the combination; or the estimated amortized cost of mechanical wear-and-tear on the resources in the combination resulting from the application of the setpoints in the combination; or the estimated value of the ancillary services provided by the resources in the combination resulting from the application of the setpoints in the combination; or the status of each of the resources in the combination; or the estimated speed of response of the resources in the combination to control signals and the estimated value of the speed of response in providing the ancillary services.

20. The apparatus as claimed in claim 11 wherein selecting a cost-effective combination of the resources and operational setpoints of these resources is based upon the estimated financial cost of operating the resources at particular setpoints.

21. The apparatus as claimed in claim 11 wherein the memory of the server further comprises statements and instructions recorded thereon and executable by the server to communicate to the ISO or utility the aggregate response of the resources to the ancillary services request.

22. The apparatus as claimed in claim 21 wherein the memory of the server further comprises statements and instructions recorded thereon and executable by the server to communicate to the ISO or utility the estimated capacity of the resources in aggregate to provide ancillary services.

23. A non-transitory computer readable medium for providing ancillary services to an Independent System Operator ("ISO") or an integrated electrical utility by directing the operation of a plurality of resources, each resource having a primary processes other than providing ancillary services, the computer readable medium having statements and instructions recorded thereon for execution by a server to perform the method as claimed in claim 1.

\* \* \* \* \*